(12) United States Patent
Fuse et al.

(10) Patent No.: US 9,438,148 B2
(45) Date of Patent: Sep. 6, 2016

(54) MOTOR DRIVE DEVICE

(71) Applicant: HITACHI AUTOMOTIVE SYSTEMS, LTD., Hitachinaka-shi, Ibaraki (JP)

(72) Inventors: Tomoyasu Fuse, Isesaki (JP); Tomonobu Koseki, Isesaki (JP); Tomishige Yatsugi, Isesaki (JP)

(73) Assignee: HITACHI AUTOMOTIVE SYSTEMS, LTD., Hitachinaka-Shi, Ibaraki (JP)

(*) Notice: Subject to any disclaimer, the term of this patent is extended or adjusted under 35 U.S.C. 154(b) by 154 days.

(21) Appl. No.: 14/206,129

(22) Filed: Mar. 12, 2014

(65) Prior Publication Data
US 2014/0265959 A1    Sep. 18, 2014

(30) Foreign Application Priority Data

Mar. 14, 2013  (JP) .................................. 2013-052145

(51) Int. Cl.
| | |
|---|---|
| *H02P 1/00* | (2006.01) |
| *H02H 7/08* | (2006.01) |
| *H02P 6/12* | (2006.01) |
| *H02P 27/06* | (2006.01) |

(Continued)

(52) U.S. Cl.
CPC ............... *H02P 6/12* (2013.01); *B62D 5/0484* (2013.01); *B62D 5/0487* (2013.01); *H02H 7/0844* (2013.01); *H02P 27/06* (2013.01); *H02P 29/027* (2013.01); *H02P 31/00* (2013.01)

(58) Field of Classification Search
CPC ............... H02P 27/06; H02P 2201/07; H02P 2201/09; H02P 2201/11; B60W 10/20; B60W 2510/20; B60W 2540/18; B60W 2710/20

USPC ........................................................ 318/139
See application file for complete search history.

(56) References Cited

U.S. PATENT DOCUMENTS 8,487,561 B2 * 7/2013 Balcon ..................... H02P 1/04
                                                318/268
2003/0071587 A1 * 4/2003 Suzuki .................. B62D 5/046
                                                318/139

(Continued)

FOREIGN PATENT DOCUMENTS

JP      03-086094 A     4/1991
JP      2009-226121 A   10/2009

(Continued)

OTHER PUBLICATIONS

Japanese Office Action dated May 31, 2016 as received in corresponding Japanese Application No. 2013-052145 and its partial English translation thereof.

*Primary Examiner* — Eduardo Colon Santana
*Assistant Examiner* — Bickey Dhakal
(74) *Attorney, Agent, or Firm* — Foley & Lardner LLP

(57) ABSTRACT

The present invention relates to a motor drive device having a drive circuit for driving a power supply relay and a phase relay providing a fail-safe function. The motor drive device includes: an inverter circuit for supplying electric power to an electric motor; a power supply relay provided on a power supply line for supplying electric power from a power supply to the inverter circuit; a phase relay provided on a drive line between the inverter circuit and the electric motor, and constituted by a semiconductor switching element; and a drive circuit connected to the phase relay and the power supply relay. The phase relay and the power supply relay share the same drive circuit, and the phase relay and the power supply relay are driven simultaneously by a drive signal output from the drive circuit.

18 Claims, 6 Drawing Sheets

(51) Int. Cl.
  *H02P 29/02* (2016.01)
  *B62D 5/04* (2006.01)
  *H02P 31/00* (2006.01)

(56) References Cited

U.S. PATENT DOCUMENTS

2004/0228059 A1* 11/2004 Mayama .......... H03K 17/08122
  361/100
2007/0052379 A1* 3/2007 Suh ..................... H02P 27/08
  318/400.26
2009/0077400 A1* 3/2009 Enami .................... G06F 1/266
  713/320
2009/0322161 A1* 12/2009 Patel ........................ H02H 3/18
  307/131
2011/0285335 A1 11/2011 Tada

FOREIGN PATENT DOCUMENTS

| JP | 2011-178245 A | 9/2011 |
| JP | 2011-244611 A | 12/2011 |
| JP | 2012-065405 A | 3/2012 |

* cited by examiner

US 9,438,148 B2

MOTOR DRIVE DEVICE

BACKGROUND OF THE INVENTION

1. Field of the Invention

The present invention relates to a motor drive device for driving an electric motor, more specifically, relates to a motor drive device having a drive circuit for driving a power supply relay and a phase relay providing a fail-safe function.

2. Description of Related Art

Japanese Laid-Open Patent Application Publication No. 2011-244611 discloses a motor drive device using a Pulse Width Modulation (PWM) control method. This motor drive device has an inverter circuit that is driven by a PWM signal having a predetermined duty, and a fail-safe circuit provided at a position between the inverter circuit and a motor.

The inverter circuit is constituted by a so-called three-phase bridge, in which each switching element performs on-off operation according to the PWM signal, to thereby supply a drive voltage from the inverter circuit through the fail-safe circuit to each phase of the motor. When, for example, an abnormality occurs, the fail-safe circuit shuts off supply of electricity from the inverter circuit to the motor to stop the motor, thus performing a fail-safe function. As the switching elements constituting the inverter circuit and the fail-safe circuit, there is disclosed an example employing N-channel MOSFETs.

In the motor drive device disclosed in the abovementioned patent document, the MOSFETs of the fail-safe circuit are individually on-off controlled by a fail-safe drive unit. Furthermore, as the power supply relay, a mechanical relay is employed, which is open-close controlled by a control unit. Although the patent document discloses that a semiconductor switching element may be employed instead of the mechanical relay, the circuit construction is one based on the premise that a mechanical switch is employed, and that the mechanical switch is controlled separately from the MOSFETs of the fail-safe circuit.

However, if the MOSFETs of the fail-safe circuit are configured to be individually on-off controlled, the circuit construction of the fail-safe drive unit becomes complicated. Furthermore, since the fail-safe drive unit is provided discretely from the control unit, there occurs a problem that the number of components increases and cost-saving becomes difficult.

SUMMARY OF THE INVENTION

It is an object of the present invention to provide a motor drive device, which can achieve simplification of the circuit construction, reduction of the number of components and resulting in a cost-reduction.

In order to achieve the abovementioned object, the motor drive device according to the present invention includes: an inverter circuit for supplying electric power to an electric motor; a power supply relay provided on a power supply line for supplying electric power from a power supply to the inverter circuit; a phase relay provided on a drive line between the inverter circuit and the electric motor and constituted by a semiconductor switching element; and a drive circuit connected to the phase relay and the power supply relay, for driving the phase relay and the power supply relay by an output of the drive circuit.

Other objects and features of aspects of the present invention will be understood from the following description with reference to the accompanying drawings.

DESCRIPTION OF THE PREFERRED EMBODIMENTS

Figure 1:
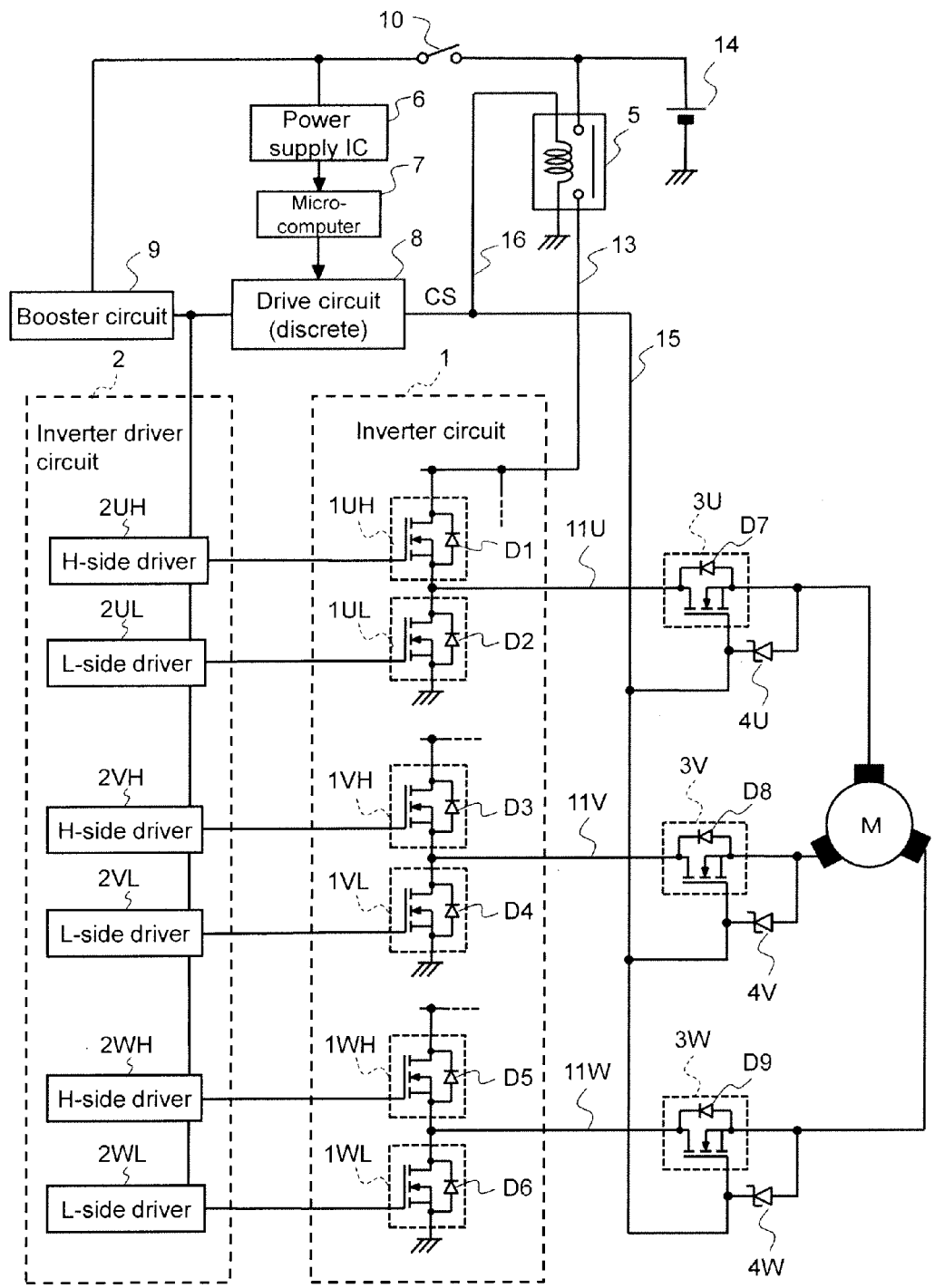
FIG. 1 is a circuit view illustrating a motor drive device according to a first embodiment of the present invention.

FIG. 1 is a circuit view illustrating a motor drive device according to a first embodiment of the present invention. This motor drive device includes an inverter circuit 1 for driving an electric motor (three-phase motor in this example) M; an inverter driver circuit 2 for controlling inverter circuit 1; phase relays 3U, 3V and 3W; zener diodes 4U, 4V and 4W for serge-protection; a power supply relay 5; a power supply IC 6; a microcomputer 7 serving as a controller; a drive circuit 8 having a discrete construction; a booster circuit 9; and a switch 10, and the like.

Inverter circuit 1 has three sets of switching elements for driving U, V and W phases, respectively, of electric motor M via drive lines 11U, 11V and 11W. In this example, the switching elements are constituted by N-channel MOSFETs 1UH, 1UL, 1VH, 1VL, 1WH and 1WL. MOSFETs 1UH and 1UL are connected in series between a power supply line 13 for supplying a power from a power supply such as a battery 14, and a ground point, so that their drain-source current paths are connected in series, and their mutual connecting point is further connected with one end of a drive line 11U. MOSFETs 1VH and 1VL are connected in series between power supply line 13 and a ground point, so that their drain-source current paths are connected in series, and their mutual connecting point is further connected with one end of a drive line 11V. MOSFETs 1WH and 1WL are connected in series between power supply line 13 and a ground point, so that their drain-source current paths are connected in series, and their mutual connecting point is further connected with one end of a drive line 11W.

Inverter drive circuit 2 has high-side (H-side) drivers 2UH, 2VH and 2WH which correspond to power supply side MOSFETs 1UH, 1VH and 1WH, respectively, and low-side (L-side) drivers 2UL, 2VL and 2WL which correspond to ground point side MOSFETs 1UL, 1VL and 1WL, respectively. These H-side drivers 2UH, 2VH and 2WH and L-side drivers 2UL, 2VL and 2WL are supplied with a boosted voltage produced by a booster circuit 9. Output terminals of H-side drivers 2UH, 2VH and 2WH are connected to gates of MOSFETs 1UH, 1VH and 1WH, respectively, so that these MOSFETs are selectively on-off controlled. Output terminals of L-side drivers 2UL, 2VL and 2WL are connected to gates of MOSFETs 1UL, 1VL and 1WL, respectively, so that these MOSFETs are selectively on-off controlled.

Phase relays 3U, 3V and 3W are provided on drive lines 11U, 11V and 11W for driving electric motor M, respectively. These phase relays 3U, 3V and 3W are semiconductor relays, and in this example, they are N-channel MOSFETs. To gates of these MOSFETs, a control signal CS is supplied from drive circuit 8 via a first control line 15. Between first control line 15 and motor-side line portions of drive lines 11U, 11V and 11W connecting phases of electric motor M and phase relays 3U, 3V and 3W, respectively, cathodes and anodes of zener diodes (first serge-protection means) 4U, 4V and 4W are connected for the respective phases, so that they serve as serge-protection circuits. That is, zener diodes 4U, 4V and 4W are provided at a position between first connecting terminals of the MOSFETs of phase relays 3U, 3V and 3W, connected to drive circuit 8, and second terminals of the MOSFETs connected to electric motor M.

According to control of microcomputer 7, drive circuit 8 supplies a control signal CS having a voltage level boosted by booster circuit 9, via first control line 15 to the phase relays 3U, 3V and 3W, to simultaneously on-off control the phase relays. Furthermore, drive circuit 8 is configured to supply control signal CS to power supply relay 5 (mechanical relay) via a second control line 16, to open-close control power supply relay 5 to thereby supply electric power (operation power) from battery 14 to inverter circuit 1.

Power supply IC 6 supplies an operation power to microcomputer 7, based on a power supply voltage supplied from battery 14 via a switch 10 such as an ignition switch. The power supply voltage is also supplied from battery 14 via switch 10 to booster circuit 9 which boosts the power supply voltage to produces a boosted voltage.

Here, in MOSFETs 1UH, 1UL, 1VH, 1VL, 1WH, 1WL and the MOSFETs constituting phase relays 3U, 3V and 3W, diodes D1 to D9 between the drains and sources are parasitic diodes.

In the above construction, when switch 10 is turned on, the operation power is supplied to microcomputer 7 from power supply IC 6, and the power supply voltage is boosted by booster circuit 9 and supplied to inverter driver circuit 2. Microcomputer 7 controls drive circuit 8 so that drive circuit 8 outputs, for example, a pulse width modulation (PWM) signal to inverter driver circuit 2. In inverter driver circuit 2, H-side drivers 2UH, 2VH and 2WH and L-side drivers 2UL, 2VL and 2WL supply drive signals based on the PWM signals, to gates of MOSFETs 1UH, 1VH, 1WH, 1UL, 1VL and 1WL in inverter circuit 1, respectively, to selectively on-off control the MOSFETs.

Furthermore, this drive circuit 8 supplies control signal CS to phase relays 3U, 3V and 3W via first control line 15, to simultaneously on-off control the phase relays, and supplies control signal CS to power supply relay 5 via second control line 16 to on-off control power supply relay 5.

Then, at a time of driving electric motor M. MOSFETs of phase relays 3U, 3V and 3W are turned on and power supply relay 5 is closed, and in this state. MOSFETs 1UH, 1VH, 1WH, 1UL, 1VL and 1WL of inverter circuit 1 are selectively on-off controlled to perform a three-phase drive of electric motor M via drive lines 11U, 11V and 11W. Here, as the case requires, the duties of the PWM signals are changed to control the rotational speed of electric motor M.

Meanwhile, when, for example, an abnormality occurs, the MOSFETs of phase relays 3U, 3V and 3W are turned off by drive circuit 8, to shut off supply of electricity from inverter circuit 1 to electric motor M, and power supply relay 5 is opened to shut off supply of electric power from battery 14. In this way, it is possible to forcefully stop electric motor M to perform a fail-safe function, and the like.

According to the abovementioned construction, it is possible to make phase relays 3U, 3V and 3W and power supply relay 5 share drive circuit 8, to simultaneously control the phase relays and the power supply relay. Accordingly, it is possible to simplify the circuit construction of the drive circuit and reduce the number of components, to thereby achieve cost reduction, downsizing, reduction of failure rate and resulting improvement of reliability, and the like.

Moreover, power supply line 13 from battery 14 to inverter circuit 1 is shut off and drive lines 11U, 11V and 11W of electric motor M are shut off to thereby stop supply of electric power to inverter circuit 1 and further stop supply of drive voltage to electric motor M, and thus, it is possible to stop electric motor M even in a case in which one of power supply line 13 and drive lines 11U, 11V and 11W cannot be shut off.

[Second Embodiment]

Figure 2:
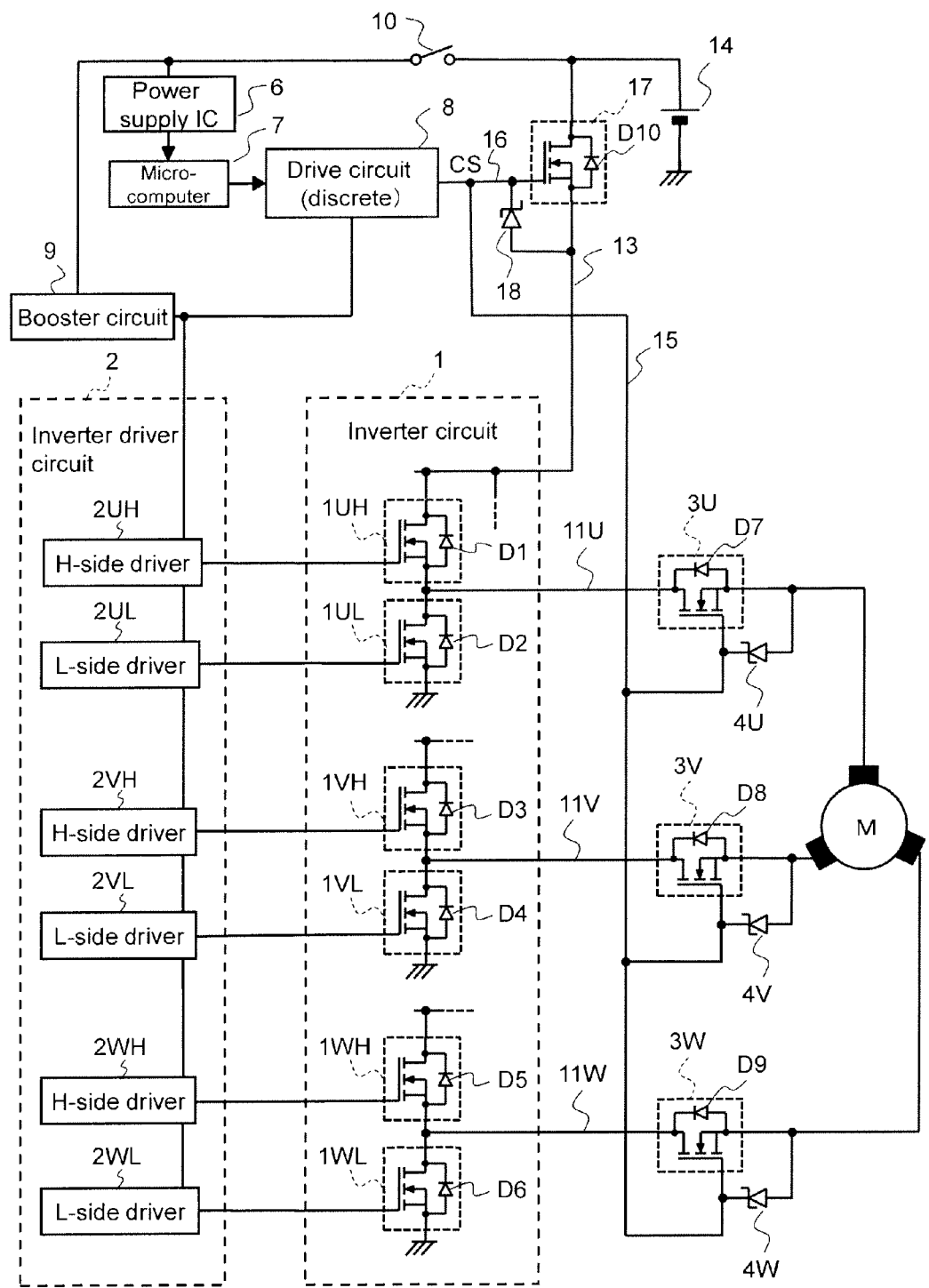
FIG. 2 is a circuit view illustrating a motor drive device according to a second embodiment of the present invention.

FIG. 2 is a circuit view illustrating a motor drive device according to a second embodiment of the present invention. This motor drive device is the same as the circuit illustrated in FIG. 1 except that power supply relay 5 is changed from the mechanical relay to a semiconductor relay. In this embodiment, an N-channel MOSFET is employed as a semiconductor switching element of power supply relay 17. This MOSFET is provided on power supply line 13, its drain is connected to a power supply such as a battery 14, and its source is connected to a power supply terminal of inverter circuit 1. Then, to a gate of this MOSFET, a control signal CS is supplied from drive circuit 8 via a second control line 16. Between the source and the gate of the MOSFET, an anode and a cathode of a zener diode (second serge-protection means) 18 serving as a serge-protection circuit, are connected, respectively.

Here, a diode D10 between the drain and the source of the MOSFET, is a parasitic diode.

Since FIG. 2 is the same as FIG. 1 in other basic circuit constructions, components of FIG. 2 common to those of FIG. 1 are indicated by the same numerals and their detailed explanations are omitted.

In the abovementioned second embodiment, since power supply relay 17 is changed from a mechanical relay to a semiconductor relay, it is possible to reduce the failure rate to improve reliability and to achieve downsizing by volume reduction.

[Third Embodiment]

Figure 3:
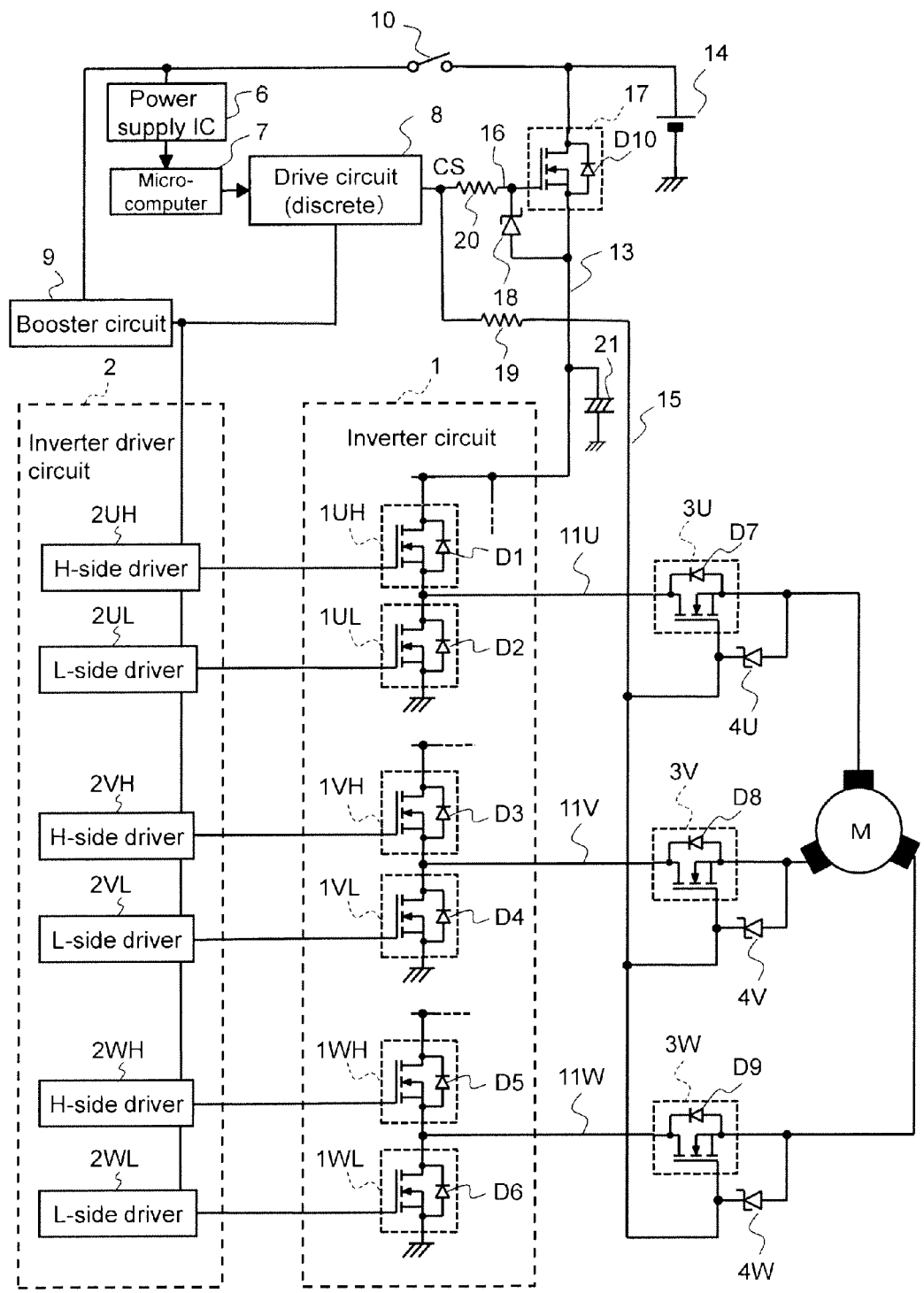
FIG. 3 is a circuit view illustrating a motor drive device according to a third embodiment of the present invention.

FIG. 3 is a circuit view illustrating a motor drive device according to a third embodiment of the present invention. This motor drive device has high-resistance resistors 19 and 20 (first and second current reducing means) provided on first control line 15 and second control line 16, respectively, of the circuit illustrated in FIG. 2. Furthermore, the motor drive device has an electric charge accumulation element, that is a smoothing capacitor (electric accumulation means) 21 provided at a position between a ground point and an inverter-side line portion of power supply line 13 connecting power supply relay 17 to inverter circuit 1.

Since FIG. 3 is the same as FIG. 2 in other basic circuit constructions, components of FIG. 3 common to those of FIG. 2 are indicated by the same numerals and their detailed explanations are omitted.

According to such a construction, when phase relays 3U, 3V and 3W are in off-state, high-resistance resistors 19 and 20 can prevent a current caused by a back electromotive force produced in a coil of electric motor M, from flowing through zener diodes 4U, 4V and 4W, first control line 15 and second control line 16 into power supply relay 17 (as a sneak current). Accordingly, it is possible to prevent a voltage between the gate and the source of the MOSFET serving as power supply relay 17, from rising to cause erroneous turning-on.

Furthermore, since smoothing capacitor 21 is provided on power supply line 13 for inverter circuit 1, it is possible to obtain a current supply capacity of inverter circuit 1. Moreover, when electric motor M stops, high-resistance resistors 20, 19 can prevent a current caused by an electric charge accumulated in smoothing capacitor 21 provided in this embodiment, from flowing through a zener diode 18, second control line 16 and first control line 15 into phase relays 3U, 3V and 3W (as a sneak current). Accordingly, it is possible to prevent a voltage between the gate and the source of the MOSFETs serving as phase relays 3U, 3V and 3W, from rising to cause erroneous turning-on.

Thus, in the third embodiment, since it is possible to reduce the sneak current caused by the sharing of drive circuit 8 by phase relays 3U, 3V and 3W and power supply relay 17, it is possible to prevent erroneous turning-on of phase relays 3U, 3V and 3W and power supply relay 17.

(First Modification)

Figure 4:
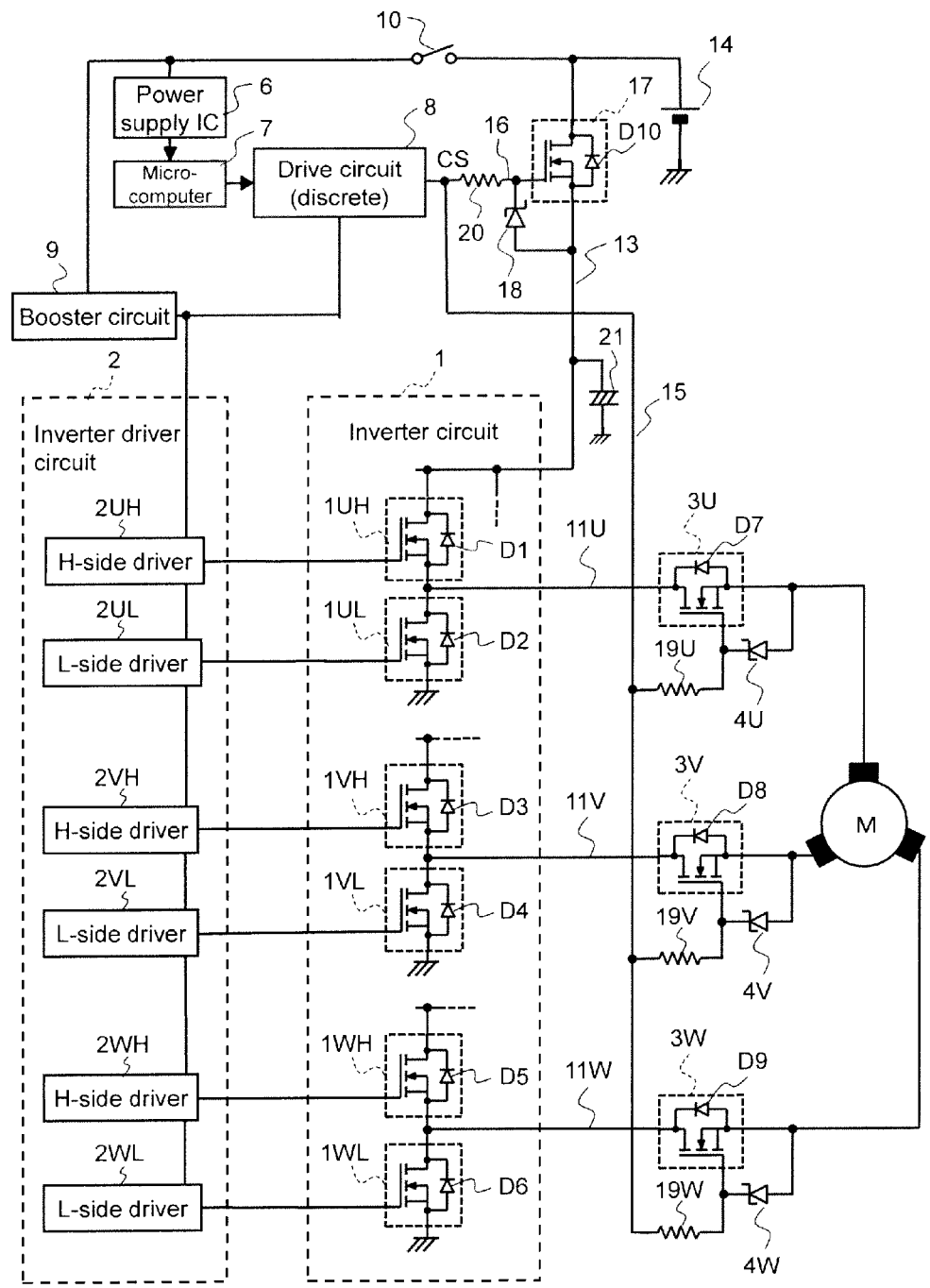
FIG. 4 is a circuit view illustrating a first modification of the motor drive device illustrated in FIG. 3.

FIG. 4 is a circuit view illustrating a first modification of the motor drive device illustrated in FIG. 3. This motor drive device is the same as the circuit illustrated in FIG. 3 except that instead of high-resistance resistor 19, high-resistance resistors 19U, 19V and 19W serving as current reducing circuits (first current reducing means) are provided at a position between the gates of the MOSFETs constituting phase relays 3U, 3V and 3W, respectively, and first control line 15 for supplying a control signal CS from drive circuit 8. In other words, while the circuit illustrated in FIG. 3 has high-resistance resistor 19 provided on first control line 15, the circuit illustrated in FIG. 4 has high-resistance resistors 19U, 19V and 19W provided at positions branched from first control line 15, so that the high-resistance resistors 19U, 19V and 19W are provided in series with zener diodes 4U, 4V and 4W, respectively.

Since FIG. 4 is the same as FIG. 3 in other basic circuit constructions, components of FIG. 4 common to those of FIG. 3 are indicated by the same numerals and their detailed explanations are omitted.

According to such a construction, when phase relays 3U, 3V and 3W are in off-state, high-resistance resistors 19U, 19V, 19W and 20 can prevent a current caused by a back electromotive force produced in a coil of electric motor M, from flowing through zener diodes 4U, 4V and 4W, first control line 15 and second control line 16 into power supply relay 17 (as a sneak current). Accordingly, it is possible to prevent the MOSFET constituting power supply relay 17, from causing erroneous turning-on.

Furthermore, when electric motor M stops, high-resistance resistors 19U, 19V, 19W and 20 can prevent a current caused by an electric charge accumulated in smoothing capacitor 21 provided in this embodiment, from flowing through a zener diode 18, second control line 16 and first control line 15 into phase relays 3U, 3V and 3W (as a sneak current). Accordingly, it is possible to prevent the MOSFETs constituting phase relays 3U, 3V and 3W, from causing erroneous turning-on.

(Second Modification)

Figure 5:
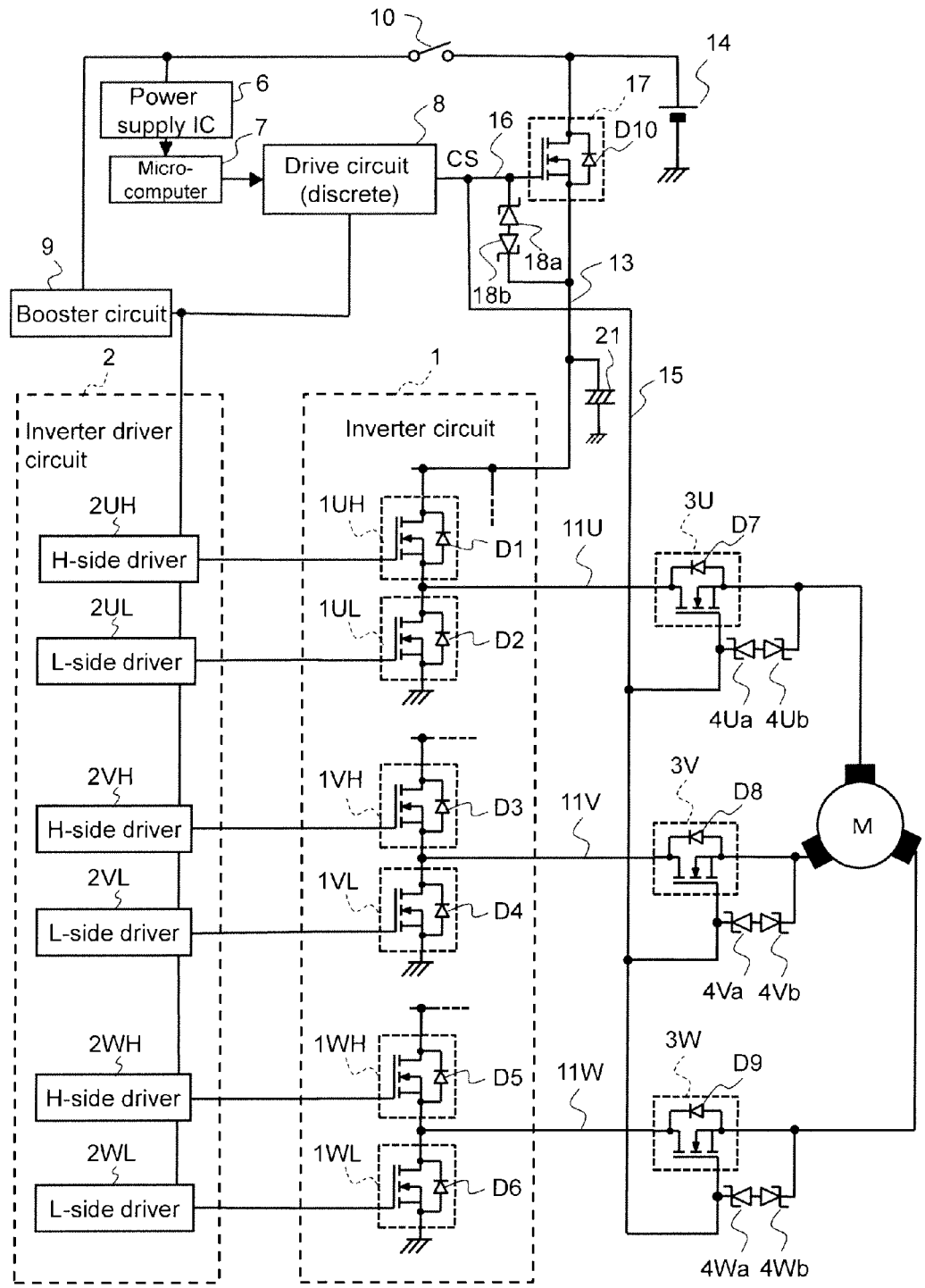
FIG. 5 is a circuit view illustrating a second modification of the motor drive device illustrated in FIG. 3.

FIG. 5 is a circuit view illustrating a second modification of the motor drive device illustrated in FIG. 3. This motor drive device employs zener diodes as first and second current reducing circuits (first and second current reducing means) instead of the resistors. That is, in addition to zener diodes 4Ua, 4Va and 4Wa for serge-protection of phase relays 3U, 3V and 3W, zener diodes 4Ub, 4Vb and 4Wb are provided to form back-to-back constructions in order to prevent a sneak current. Furthermore, in addition to a zener diode 18a for serge-protection of power supply relay 17, a zener diode 18b is provided to form a back-to-back construction in order to prevent a sneak current. Zener diodes 4Ub, 4Vb and 4Wb function as the second current reducing circuits, in other words, second current reducing means.

Since FIG. 5 is the same as FIG. 3 in other basic circuit constructions, components of FIG. 5 common to those of FIG. 3 are indicated by the same numerals and their detailed explanations are omitted.

According to such a construction, when phase relays 3U, 3V and 3W are in off-state, zener diodes 4Ub, 4Vb and 4Wb provided in the reverse direction can prevent a current caused by a back electromotive force produced in a coil of electric motor M, from flowing through zener diodes 4Ua, 4Va and 4Wa, first control line 15 and second control line 16 into power supply relay 17. Accordingly, it is possible to prevent power supply relay 17 from malfunctioning.

Furthermore, when electric motor M stops, zener diode 18b can prevent a current caused by an electric charge accumulated in smoothing capacitor 21 provided in this embodiment, from flowing through zener diode 18a, second control line 16 and first control line 15 into phase relays 3U, 3V and 3W. Accordingly, it is possible to prevent phase relays 3U, 3V and 3W, from malfunctioning.

Here, in the first to third examples and the first and second modifications, the output of booster circuit 9 is supplied to inverter driver circuit 2 and drive circuit 8. However, the output may be supplied also to inverter circuit 1 so that a boosted voltage is supplied to power supply relay 17, phase relays 3U, 3V and 3W and inverter circuit 1, from the same booster circuit.

Furthermore, examples of employing zener diodes for serge-protection have been described. However, diodes may be employed, and a plurality of stages of diodes may be connected in series as the case requires. Furthermore, examples of employing resistors or zener diodes for reducing sneak currents have been described. However, diodes, other load element, or a combination of them may be employed.

(Application Example)

Figure 6:
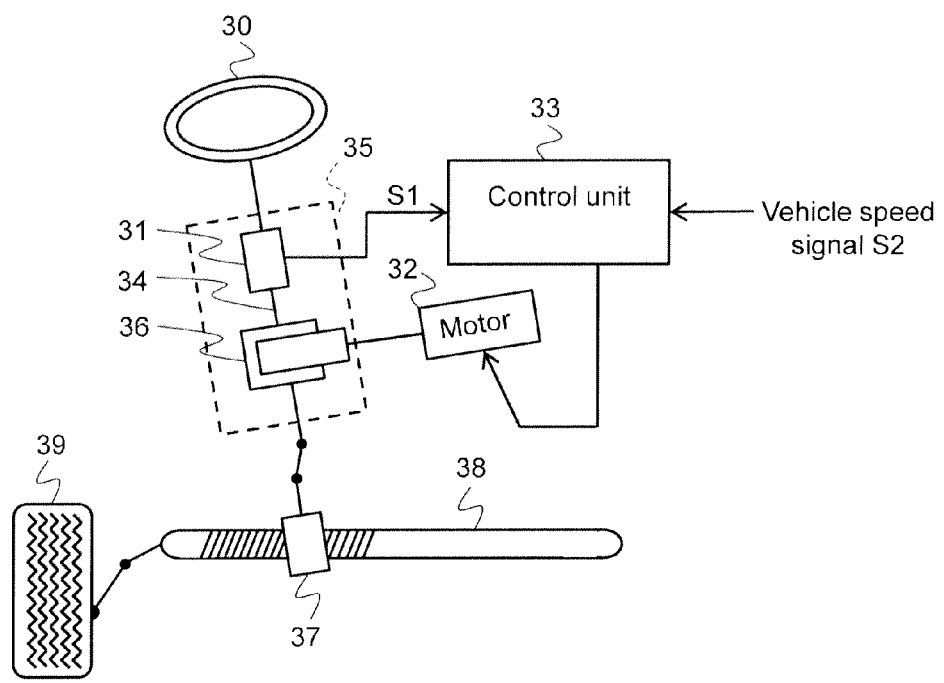
FIG. 6 is a schematic view illustrating a construction example of an EPS system including an assisting power steering motor to which the motor drive device according to an embodiment of the present invention is applied.

FIG. 6 is a schematic view illustrating a construction example of an electric power steering (EPS) system including an assisting power steering motor to which the motor drive device according to an embodiment of the present invention is applied. This EPS system includes a steering wheel 30, a steering torque detection sensor 31, an assisting motor 32 and a control unit 33, and the like. In a steering column 35 enclosing a steering shaft 34, steering torque detection sensor 31 and a reduction gear unit 36 are provided.

When a vehicle driver operates steering wheel 30, a steering torque generated in steering shaft 34 is detected by steering torque detection sensor 31, and according to this steering torque signal S1 and an a vehicle speed signal S2 and the like, control unit 33 drives assisting motor 32 so that assisting motor 32 produces a steering assisting force suited to a driving condition. By this method, when a pinion gear 37 provided at a tip end of steering shaft 34 is rotated, a rack shaft 38 moves horizontally in left-right direction with respect to the moving direction of the vehicle, whereby the operation of steering wheel 30 by the vehicle driver is propagated to tires 39 to turn the direction.

Here, assisting motor 32 corresponds to electric motor M, control unit 33 corresponds to microcomputer 7, steering torque signal 51 and vehicle speed signal S2 are supplied to microcomputer 7 to control drive circuit 8. Then, assisting motor 32 is driven by inverter driver circuit 2 and inverter circuit 1, to produce a steering assisting force suited to a driving condition, to thereby constitute an EPS system having functions and effects described in the abovementioned embodiments and their modifications.

(Study Result)

Costs are estimated with respect to a conventional electronic control unit (ECU) having a construction having drive circuits for every relays, and the circuit constructions according to the embodiments of the present invention, and as a result, it was confirmed that a 25% cost reduction was possible.

Here, it is a matter of course that the motor drive device of the present invention can be applied not only to the abovementioned assisting motor for power steering, but also to drive of various types of electric motors.

The entire contents of Japanese Patent Application No. 2013-052145 filed on Mar. 14, 2013, on which priority is claimed, are incorporated herein by reference.

While only a select embodiment has been chosen to illustrate and describe the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and it is not for the purpose of limiting the invention, the invention as claimed in the appended claims and their equivalents.

What is claimed is:

1. A motor drive device comprising:
   an inverter circuit for supplying electric power to an electric motor;
   a power supply relay provided on a power supply line for supplying electric power from a power supply to the inverter circuit;
   a phase relay provided on a drive line between the inverter circuit and the electric motor, and constituted by a semiconductor switching element;
   a drive circuit connected to the phase relay and the power supply relay, for driving the phase relay and the power supply relay;
   a first control line connecting the drive circuit to the phase relay;
   a first surge-protection circuit provided at a position between the first control line and a motor-side line portion of the drive line connecting the electric motor to the phase relay, and configured to protect the phase relay from surge voltage;
   a first current reducing circuit configured to reduce a sneak current flowing from the electric motor into the first control line;
   a second control line connecting the drive circuit to the power supply relay;
   an electric charge accumulation element provided on an inverter-side line portion of the power supply line between the inverter circuit and the power supply relay, and configured to have a current supply capacity of the inverter circuit;
   a second surge-protection circuit connected at a position between the second control line and the inverter-side line portion; and
   a second current reducing circuit configured to reduce a sneak current flowing from the electric charge accumulation element into the second control line.

2. The motor drive device according to claim 1, wherein the first current reducing circuit is provided on the first control line.

3. The motor drive device according to claim 1, wherein the first current reducing circuit is provided at a position branched from the first control line so as to be in series with the first surge-protection circuit.

4. The motor drive device according to claim 1, wherein
   the first surge-protection circuit includes at least one of a zener diode and a diode, and
   the first current reducing circuit includes at least one of a zener diode, a diode, a resistor and a load element.

5. The motor drive device according to claim 1, wherein the semiconductor switching element constituting the phase relay includes an N-channel MOSFET.

6. The motor drive device according to claim 1, wherein the electric motor is a three-phase motor.

7. The motor drive device according to claim 6, wherein the inverter circuit includes an upstream side drive element and a downstream side drive element provided for each of drive lines of the three-phase motor so as to correspond to each phase.

8. The motor drive device according to claim 7, further comprising
   an inverter driver circuit supplied with a boosted power supply voltage and for controlling the inverter circuit.

9. The motor drive device according to claim 8, wherein the inverter driver circuit includes, for each phase, a high-side driver for controlling the upstream side drive element of the inverter circuit and a low-side driver for controlling the downstream side drive element of the inverter circuit.

10. The motor drive device according to claim 1, further comprising:
    a booster circuit for boosting the power supply voltage, and supplying the boosted voltage to the drive circuit so that the drive circuit supplies a control signal based on the boosted voltage to the phase relay and the power supply relay.

11. The motor drive device according to claim 1, further comprising:
    a microcomputer for controlling the drive circuit; and
    a power supply IC for supplying an operation power to the microcomputer based on the power supply voltage.

12. The motor drive device according to claim 1, wherein the power supply relay includes one of a mechanical relay and a semiconductor relay.

13. A motor drive device comprising:
    an inverter circuit for supplying electric power to an electric motor;
    a power supply relay provided on a power supply line for supplying electric power from a power supply to the inverter circuit;
    a phase relay provided on a drive line between the inverter circuit and the electric motor, and constituted by a semiconductor switching element;
    a drive circuit connected to the phase relay and the power supply relay, for driving the phase relay and the power supply relay;
    a control line connecting the drive circuit to the power supply relay;
    an electric charge accumulation means provided on an inverter-side line portion of the power supply line between the inverter circuit and the power supply relay;
    a surge-protection means connected at a position between the control line and the inverter-side line portion; and
    a current reducing means for reducing a sneak current flowing from the electric charge accumulation means into the control line.

14. A motor drive device comprising:
an inverter circuit for supplying electric power to an electric motor;
a power supply relay provided on a power supply line for supplying electric power from a power supply to the inverter circuit;
a phase relay provided on a drive line between the inverter circuit and the electric motor, and constituted by a semiconductor switching element;
a drive circuit connected to the phase relay and the power supply relay, for driving the phase relay and the power supply relay;
a control line connecting the drive circuit to the power supply relay;
an electric charge accumulation element provided on an inverter-side line portion of the power supply line between the inverter circuit and the power supply relay, and configured to have a current supply capacity of the inverter circuit;
a surge-protection circuit connected at a position between the control line and the inverter-side line portion; and
a current reducing circuit configured to reduce a sneak current flowing from the electric charge accumulation element into the control line.

15. The motor drive device according to claim 14, wherein the power supply relay is constituted by a semiconductor switching element.

16. The motor drive device according to claim 14, wherein the electric charge accumulation element is a smoothing capacitor provided at a position between the power supply line and a ground point.

17. The motor drive device according to claim 14, wherein the current reducing circuit includes at least one of a zener diode, a diode, a resistor and a load element, provided on the control line.

18. The motor drive device according to claim 14, wherein the current reducing circuit includes one of a zener diode and a diode, connected in series to the surge-protection circuit.

* * * * *